United States Patent
Hansen

(10) Patent No.: US 8,103,849 B2
(45) Date of Patent: Jan. 24, 2012

(54) REDUCING MEMORY USAGE OF KERNEL MEMORY MANAGEMENT STRUCTURES

(75) Inventor: David C. Hansen, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 12/429,755

(22) Filed: Apr. 24, 2009

(65) Prior Publication Data

US 2010/0275193 A1 Oct. 28, 2010

(51) Int. Cl.
*G06F 9/26* (2006.01)

(52) U.S. Cl. ........ 711/203; 711/204; 711/202; 711/205; 711/209

(58) Field of Classification Search ................. 711/203, 711/204, 202, 205, 209
See application file for complete search history.

(56) References Cited

U.S. PATENT DOCUMENTS

| | | | |
|---|---|---|---|
| 5,721,917 | A | 2/1998 | Elliott et al. |
| 5,754,817 | A * | 5/1998 | Wells et al. ................. 711/203 |
| 7,219,206 | B1 | 5/2007 | McPolin |
| 7,895,410 | B1 * | 2/2011 | Wu ............................... 711/203 |
| 2007/0055843 | A1 * | 3/2007 | Lameter ....................... 711/206 |
| 2007/0106875 | A1 | 5/2007 | Mather |
| 2007/0118712 | A1 | 5/2007 | Van Riel et al. |

OTHER PUBLICATIONS

Linux Programmer's Manual, Jan. 1999, pp. 1-5, http://www.complang.tuwien.ac.at/ulrich/mergemem/mmlib.3.html.
Hot-Add Memory Architecture and Design, 14 pages, 2003, http://linux-memhotadd.sourceforge.net/hotadd.html.
"Operating System Support for Hot-pluggable Memory," Matthew Tolentino, 2008, 7 pages.
"Where is the memory going? Memory waste under Linux," Andi Kleen, Aug. 15, 2006, 5 pages.
"Memory management by the Linux kernel: #1 outside the kernel", Jun. 23, 2005, http://neworder.box.sk/print/13760.
Understanding the Linux Virtual Memory Manager, Mel Gorman, 2004, 748 pages.

* cited by examiner

*Primary Examiner* — Alexander Sofocleous
*Assistant Examiner* — Han Yang
(74) *Attorney, Agent, or Firm* — Walter W. Duft

(57) ABSTRACT

One aspect of the present invention relates to techniques utilized within an operating system or a similar virtualization environment for reducing overhead of memory management data structures. Memory management data structures are used by operating systems to track the location of hardware pages in physical memory, consuming around 1% of a computer system's physical memory. However, these data structures may be classified as redundant when multiple data structures are used to track the same virtual memory pages stored within physical memory. One embodiment discloses an operation that identifies redundant data structures tracking frames of a single large page that are stored contiguously in the physical memory. Once identified, the redundant data structures may be removed from physical memory, freeing the physical memory for other uses. A further embodiment enables recreation of the removed data structures in physical memory if later accessed within the operating system.

21 Claims, 6 Drawing Sheets

REDUCING MEMORY USAGE OF KERNEL MEMORY MANAGEMENT STRUCTURES

FIELD OF THE INVENTION

The present invention generally relates to memory management within software environments executing on a computer system. The present invention more specifically relates to the use and management of kernel memory management data structures within an operating system or a virtual machine environment executing on a computer system.

BACKGROUND OF THE INVENTION

For many years, computers typically utilized only one hardware page size: 4 KB. Many software applications were built on assumptions about this page size and relied on its usage. Today, this hardware page size is still commonly in use (such as in x86 architectures), but for performance reasons, larger page sizes are created at the virtual memory level (i.e., within the operating system or software level, as distinguished from the 4 KB hardware pages allocated within physical memory). For example, some operating systems and databases utilize virtual memory pages which span multiple megabytes or even gigabytes.

Generally, an operating system creates a data structure to track each physical memory page utilized by virtual memory. For example, in Linux, each physical memory page frame has a small corresponding data structure (struct page) also stored in memory that is used to track the status of the page frame. These data structures by themselves consume a fixed percentage of the total physical memory in the machine, approximately 1% of a system's physical memory. For example, on a machine with 1TB of memory, about 10 GB of memory is dedicated these data structures. As the amount of physical memory in the system grows, so does the number and size of data structures needed to track the page frames in physical memory. (For simplicity, these data structures tracking physical memory page frames in the kernel are hereinafter referred to as "kernel memory management data structures").

One ongoing trend in computer systems is an increase in page sizes used within an operating system's virtual memory. The use of larger page sizes within virtual memory provides significant advantages for modern software applications. However, the use of larger page sizes is also likely to waste a larger amount of memory with unnecessary kernel memory management data structures, as the number of base hardware pages assigned to each large page increases. For example, with 16 MB page mappings being used on a system with a 4K base page size, this would mean that there are 4096 hardware pages mapped to every 16 MB virtual memory page. Therefore, 4096 kernel memory management structures would be associated with each virtual memory page. In practice, however, only the information of the first 4K hardware page will be utilized to determine the starting point for the 16 MB page if the 16 MB page is located contiguously in 4K chunks in physical memory. With the use of larger virtual memory page sizes, a significant number of the kernel memory data structures tracking the hardware pages—as many as 4095 in the preceding example—would be redundant and unused.

One workaround to the problem of wasted memory allocated to kernel memory management structures might be to track every single hardware page in a tree structure, adding entries for pages one at a time. Although this would prevent wasting memory on redundant structures, such a tree would be slow and complex to access. Likewise, if all memory was managed in one single flat structure, it would be simple and fast to access, but would be inflexible and waste space for areas not currently in use. To enable performance by efficiently adding memory in the largest amounts possible (such as when hotplugging memory), enhanced techniques for managing existing kernel memory management structures are needed. The techniques utilized within the presently disclosed invention attempt to solve the above-described limitations by reducing the overhead of these memory structures and the need to store redundant memory structures in physical memory.

BRIEF SUMMARY OF THE INVENTION

One aspect of the present invention relates to the reduction of memory usage in a computer system for memory management structures utilized in operating systems and other virtual memory environments. In one embodiment, operations are performed within the operating system kernel to detect excess memory management data structures of the kernel that are redundantly tracking the same large page in memory. Once these redundant memory management data structures are located, then the physical memory resources behind these structures can be freed or dynamically managed as necessary.

Because an operating environment (i.e., an operating system kernel or a hypervisor) actively manages paging, the operating environment knows what is stored within virtual memory pages and is easily able to recognize redundant or unused references to physical memory. Accordingly, the operating environment can be configured to perform actions to remove redundant memory management data structures. In one embodiment, a kernel or the hypervisor operates to simply throw those data structures away by removing hardware page table mappings to the area of memory where the structures are stored. In the case that the memory management data structures are later referenced, such as in the case where a large page is later broken down into small pieces, a call into the kernel or hypervisor could be made to recreate the contents of the required memory management data structure(s). Further, functionality can be incorporated into a page fault handler of the operating system environment to seamlessly manage access to and re-creation of the memory management data structures.

In one embodiment, an operation for reducing the memory usage of memory management data structures in a kernel or other virtual memory environment comprises a technique which removes redundant memory management data structures tracking contiguous frames of a virtual memory page. Both of the frames of the virtual memory page and the data structures themselves are stored within physical memory of a computer system, but this operation only removes the small data structures tracking the virtual memory page frames.

Consistent with a typical operating system environment, each frame of the virtual memory page is tracked using one or more data structures stored within physical memory. Further, each data structure corresponding to one frame of the virtual memory page is also stored within physical memory, and the data structures are managed by a kernel of the operating system environment executing on the computer system. In one embodiment, the kernel of the operating system environment is modified to automatically detect and remove redundant data structures as they are deployed for large virtual memory pages.

Redundant data structures may be discovered within the physical memory by locating the frames of a virtual memory page that are stored contiguously within the physical memory. The first data structure tracking the first contiguous frame of this virtual memory page is not classified as redundant, as it is used to point to the first location in physical memory by which other locations may be derived. Removing the remaining data structures that track a contiguous portion of memory may be simply performed by freeing the physical memory backing the resources of the redundant data structures.

In further embodiments, the contiguous redundant data structures are determined by performance of a detection operation within the kernel. Alternately, removal of contiguous redundant data structures may be determined by being expressly specified or provided to a removal operation. The contiguous redundant data structures may also be determined responsive to a change within the operating system environment. For example, during the performance of a partial memory hot-add operation, the operating system may track which kernel structures are unused during the hot-add operation.

DETAILED DESCRIPTION OF THE INVENTION

One aspect of the present invention relates to improved techniques which manage and recover wasted space in physical memory consumed by kernel memory management structures. These kernel memory management structures are used within the operating system or other virtual operating environments to correlate a virtual memory page with an appropriate addressable location in the physical memory. The kernel memory management structures often become redundant when the size of virtual memory pages is larger than the size of physical memory pages, because multiple memory management structures are utilized to track the contents of a single virtual memory page stored contiguously in memory. The disclosed embodiments of the present invention operate to free the unnecessary space consumed by the redundant memory management structures, and handle the cases where removed memory management structures need to be recreated or accessed at a later time.

Existing memory reclamation processes typically only operate at the virtual memory level to clean up unnecessary pages within the virtual memory itself. Kernel memory management data structures are fundamentally different from the pages or other data structures used in user applications or virtual memory, and it is more difficult to reclaim space and manage page faults that might occur for the data structures managing access to the virtual memory pages in the actual physical memory. Additionally, unlike memory management techniques that only operate to remove identical or duplicate pages within the operating system's virtual memory, the disclosed embodiments of the present invention do not require that kernel memory management structures be identical or duplicate in order to remove the unnecessary structure and obtain space savings.

With use of the disclosed embodiments of the present invention, kernel memory management structures that have been traditionally locked into memory can be detected as redundant, and the redundant structures can be removed from physical memory as necessary. An intelligent kernel or hypervisor can be configured to automatically detect this redundancy even if the contents of the memory structure are not identical, thereby freeing the locked memory back into another resource pool.

A further aspect of the present invention relates to enhanced flexibility for the management of kernel memory structures. For example, when hotplugging memory into a computer system, it is hard (if not impossible) to resize operating system memory structures while software is executing within the machine. Therefore, it is often advantageous to utilize larger page sizes within the operating system to avoid the need to perform these resizing operations at a later time. The disclosed memory management techniques operate to enable the use of larger page sizes while preventing the needless waste of space with unnecessary memory management structures in such configurations.

Figure 1A:
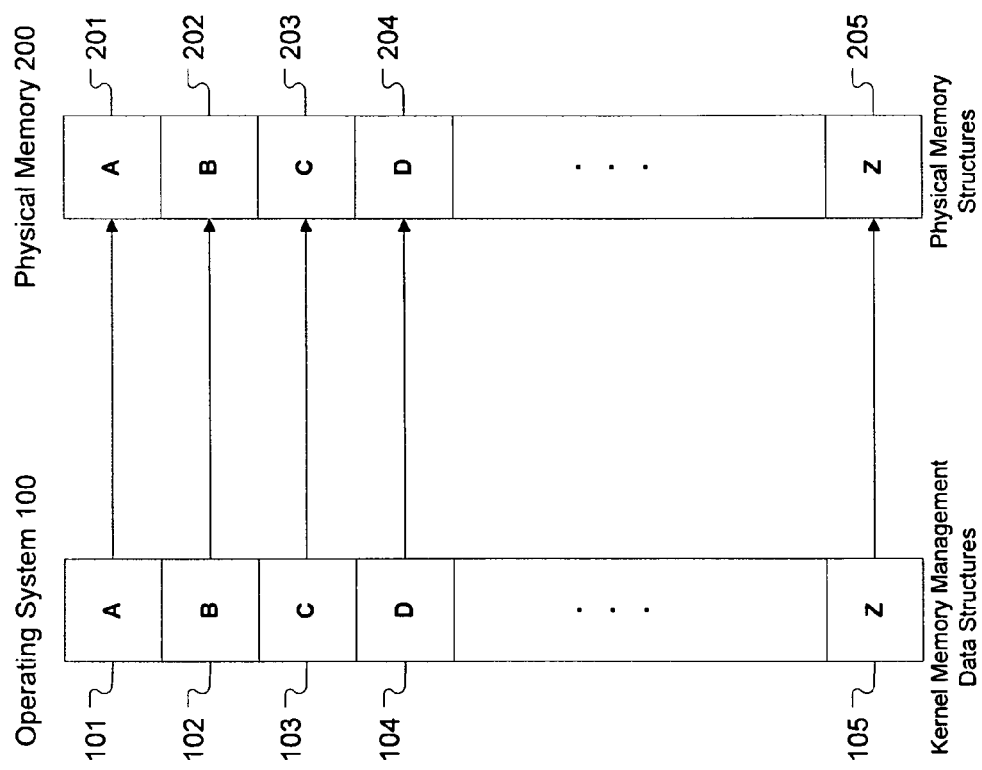
FIG. 1A illustrates storage of memory management structures within physical memory in an operating system environment as known in the prior art.

FIG. 1A illustrates storage of kernel memory management structures generated in an operating system 100 within locations in physical memory 200 as known in the prior art. As depicted, memory management structures A-Z 101-105 are stored in physical memory locations 201-205. The memory management structures A-Z 101-105 are used to correspond to chunks of a virtual memory page within the operating system (not depicted). Typically for an x86 environment, each chunk of the virtual memory stored in physical memory is 4 KB, whereas the size of the memory management structure deployed by the operating system is typically approximately 32 bytes for 32-bit architectures (44 bytes in the Linux kernel), and approximately 64 bytes for 64-bit architectures.

In the simplified example of FIG. 1A, when the virtual memory page is accessed within the operating system, the kernel memory management structures are accessed in order to determine the precise physical location of the corresponding chunks of virtual memory stored in physical memory. Thus, access to the virtual memory page would trigger access to memory management structure A 101 in the operating system to retrieve the data of memory management structure A from physical memory location 201. The memory management data structure A contains the address of its corresponding virtual memory page chunk stored in memory (which is a part of the virtual memory page). This process is repeated as necessary to obtain location of all chunks of the virtual memory page. Therefore, once the data structure is accessed, the physical memory location of that portion of the page will be accessed, eventually enabling all pieces of the virtual memory page to be accessed within the operating system.

Figure 1B:
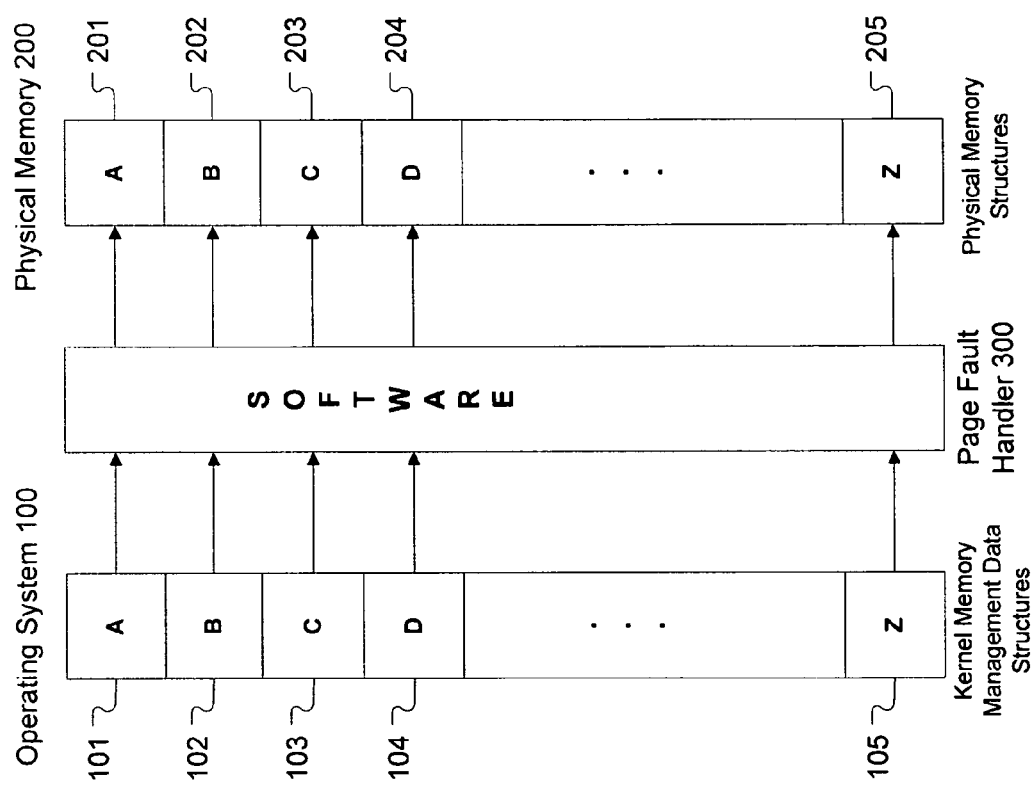
FIG. 1B illustrates a storage of memory management structures within physical memory in an operating system environment with use of a page fault handler software layer as known in the prior art.

FIG. 1B illustrates the use of software known in the prior art to manage the mapping between the kernel memory management structures and physical memory, depicted as a page fault handler 300. A page fault handler is configured to understand how the mapping is made and respond to requests for the memory management structures within the operating system. The page fault handler is capable of handling requests for pages located in different locations within the physical memory, and to handle the cases where the virtual memory page being accessed does not exist. The page handler operates to translate the operating system address into the appropriate physical memory address, and therefore can access the correct page frames in physical memory even if a structure with its address does not otherwise exist.

Figure 2A:
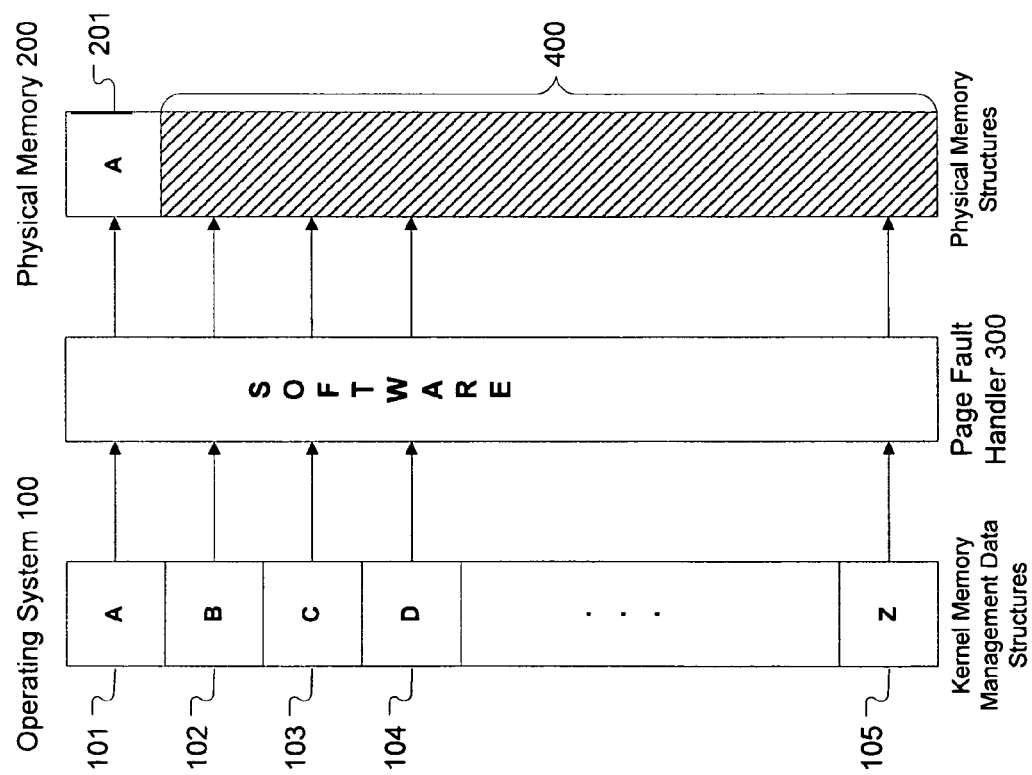
FIG. 2A illustrates storage of memory management structures within physical memory in an operating system environment after freeing redundant structures in the physical memory in accordance with one embodiment of the present invention.

FIG. 2A illustrates the operation of one embodiment of the present invention to free redundant memory management structures. In this case, even though memory management data structures were originally stored in physical memory for structures A-Z, only the first block 201 is needed in physical memory to identify the subject virtual memory page. Because the physical memory locations of the frames for the subject virtual memory page are contiguous, the values of the memory management structures are sequential and can be calculated by the page fault handler. Therefore, the contents of the memory management structures can be considered redundant, and all of the physical memory previously used for data structures B-Z in area 400 can freed for other uses. Again, the virtual memory page frames (the actual data) that were being tracked by structures A-Z remains intact and unchanged, and only the unnecessary memory management structures tracking the page have been removed. In one embodiment, the physical memory is freed by removing hardware page table mappings to the locations of the unnecessary data structures, and allocating this space as available within another resource pool.

Figure 2B:
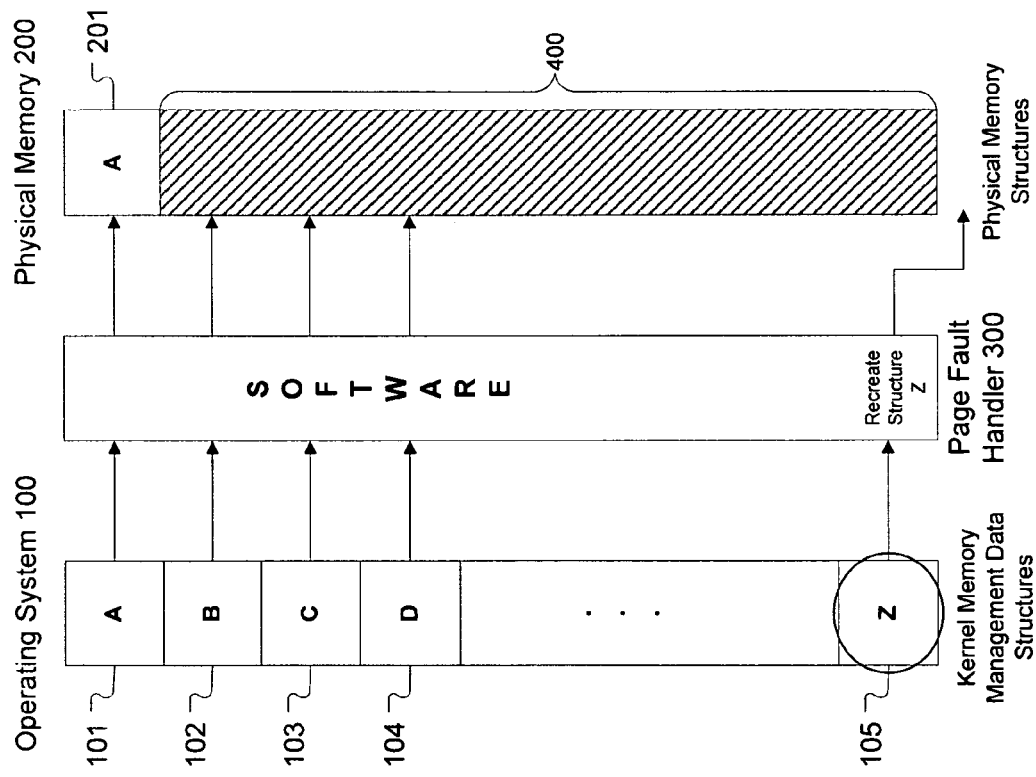
FIG. 2B illustrates access to a memory management structure in an operating system mapped to a freed physical memory location within physical memory in accordance with one embodiment of the present invention.

FIG. 2B illustrates the case where memory management structure Z 105 is accessed within the operating system. Because the underlying memory management structure that was previously determined to be redundant has been removed from the physical memory, this structure cannot be accessed in memory, and the page fault handler 300 will need to compensate for the lack of this structure. However, because structure A 201 still exists, and the memory management structures merely contained data tracking contiguous memory locations, the value that previously existed in the Z memory management data structure can be determined. Therefore, the page fault handler 300 can calculate the appropriate data of structure Z, and additionally can be configured to recreate the correct values of data structure Z for use by the operating system.

Figure 2C:
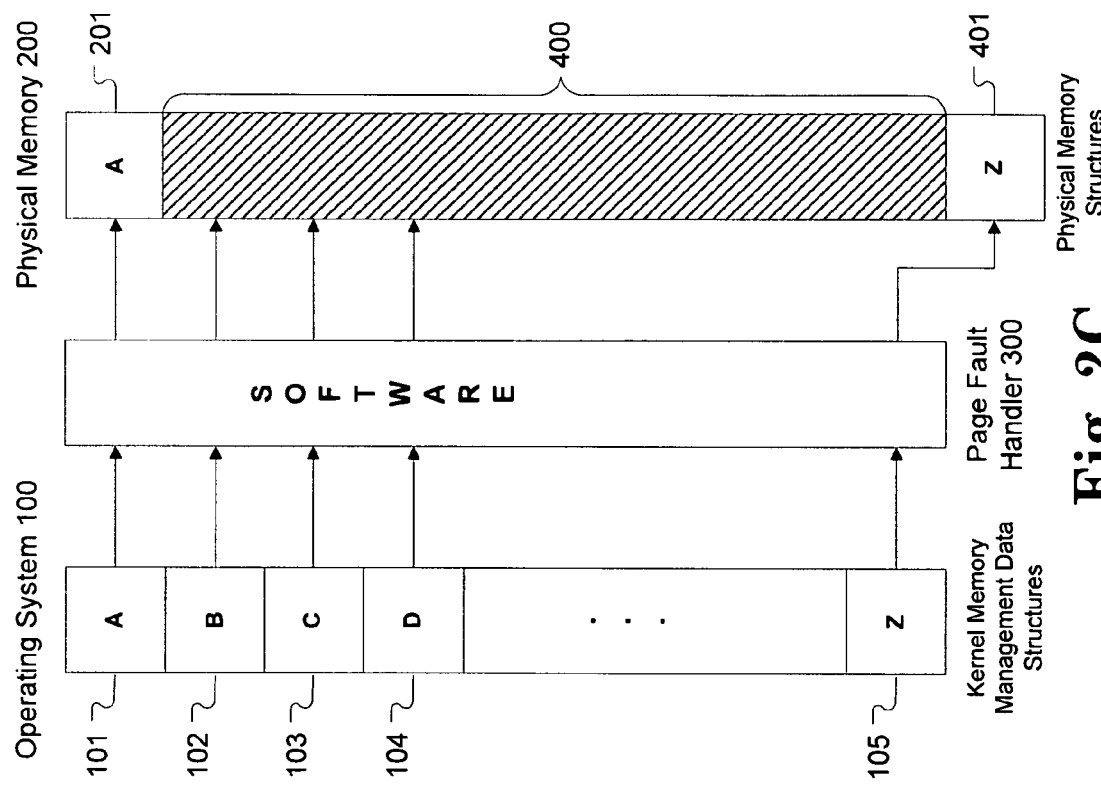
FIG. 2C illustrates access to a memory management memory structure mapped to a recreated physical memory location in accordance with one embodiment of the present invention.

In this embodiment, the role of the page fault handler within the operating system is expanded to handle removed memory management data structures. Thus, the data structure Z that was removed can also be recreated and replaced in memory seamlessly by the page fault handler 300. FIG. 2C illustrates the recreation of the data structure, with end result of structure Z 105 in the operating system now pointing to structure Z 401 recreated in physical memory. As is shown, the structure Z 401 has been recreated in a different location than it originally existed within the physical memory. Therefore, whether or not the physical memory area 400 is allocated to other uses, the requested memory management data structure can still be obtained and accessed in physical memory, because the value of structure Z can be derived from the data within structure A 201. After creation of the memory management data structure Z 400, normal access to Z and its accompanying virtual memory page chunk may resume within the operating system, while the physical memory space previously consumed by structures B through Y 400 continues to be unused and with no resources allocated to these memory management data structures.

Figure 3:
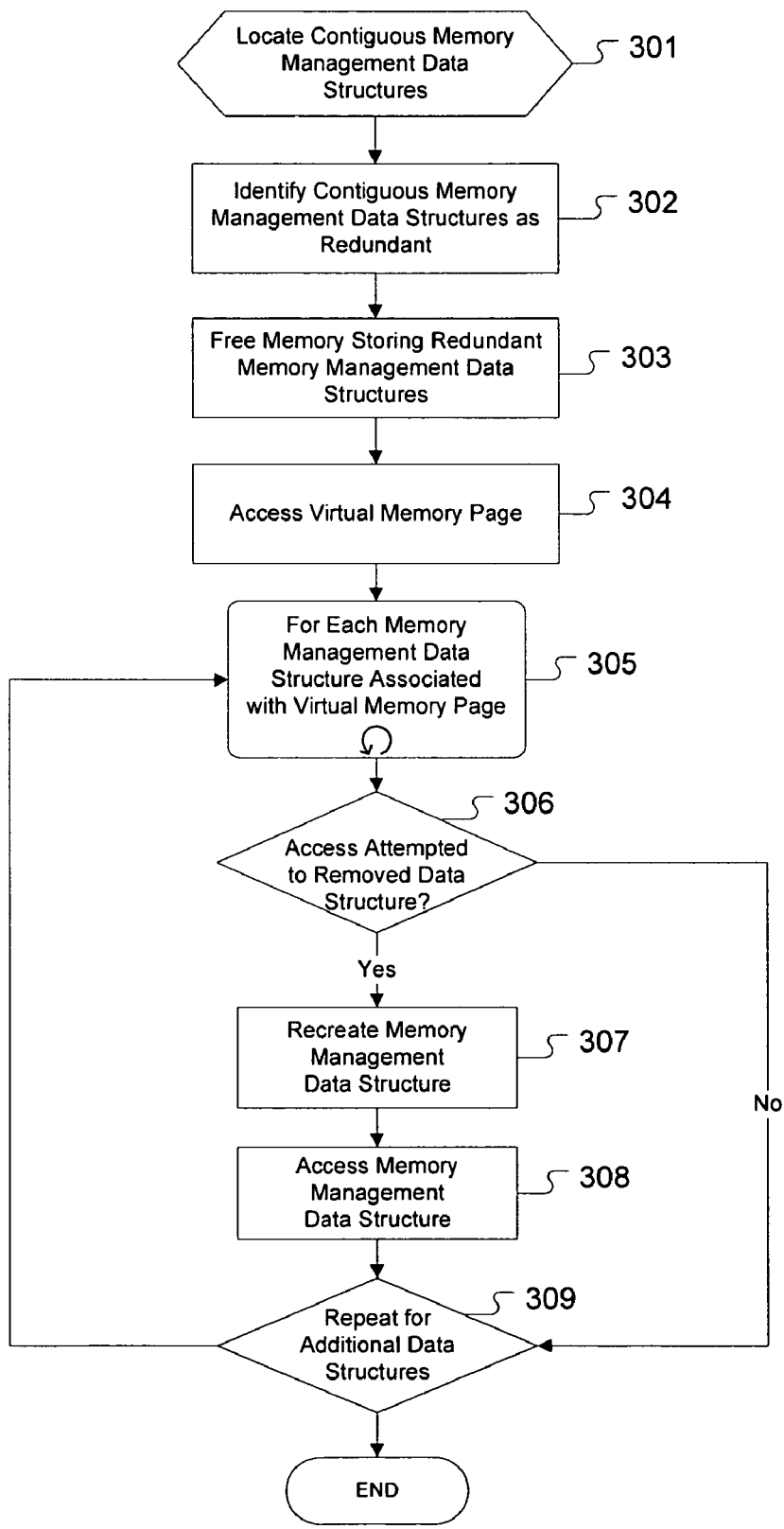
FIG. 3 illustrates a flowchart of an example method for reducing memory usage of kernel memory management structures according to one embodiment of the present invention.

A summarized view of an operation for reducing memory usage of kernel memory management structures is further illustrated in FIG. 3, and includes performance of the following steps. Those skilled in the art would recognize that numerous modifications to the following steps may be made in accordance with the presently disclosed invention, to remove a different number of data structures or to utilize different removal mechanisms within varying sequences. Likewise, the following operation may be modified to remove only selected memory management data structures, or may be modified to use another optimized removal algorithm.

Upon commencement of the operation to remove unnecessary kernel memory management data structures, the system locates any contiguous memory management data structures which are stored in physical memory as in step 301. As previously discussed, when multiple kernel memory management data structures that are stored in memory point to the same virtual memory page, only the first structure needs to be saved within memory in order to determine the location of the virtual memory page. Therefore, the other data structures associated with the same virtual memory page may be classified as redundant and marked for removal.

Next, as in step 302, these redundant data structures are identified within the physical memory. In one embodiment, the location of the contiguous redundant data structures may be detected by performance of an automated operation within the kernel, while in another embodiment the data structure(s) which are redundant may be explicitly specified within a memory cleanup operation. For example, the recognition of the redundant data structures may be performed by an operating system kernel which has recently performed a "partial memory hot-add operation" and knows which kernel structures are unused. Alternatively, this identification operation may be easily performed by management operations within a kernel that utilizes large hardware pages having accompanying unused kernel structures.

Next, as in step 303, an operation executes to free up the memory backing resources behind the redundant kernel memory management data structures. In one embodiment, this free-up operation is accomplished by invalidating the hardware page table mappings to the structures, thereby freeing the memory spaces pages underlying those kernel memory management structures.

In the case as in step 304 where the virtual memory page is later accessed within the operating system, the contents of the relevant memory management data structures will need to be determined as necessary to enable access to the memory locations being tracked by the memory management data structures. Therefore, the following steps will be repeated for each memory management data structure that is associated with the virtual memory page being accessed as in step 305.

As in step 306, if access is being attempted to a portion of the virtual memory page that has an accompanying memory management data structure that was not removed, then no further processing is necessary. For example, if the beginning of the virtual memory page is being accessed in memory, then the first memory management data structure (which was not previously removed) can be accessed to give access to its corresponding page in physical memory and any contiguous locations of page frames in physical memory.

If however, access is attempted to a removed data structure as in step 306, such as a latter portion of a virtual memory page contiguously stored in physical memory, then a memory management structure will need to be recreated to enable the kernel to properly access the location in physical memory. As in step 307, a call into the kernel is made to recreate the data structure. The correct contents of this data structure can be recreated from the first non-redundant structure which was not removed in the physical memory.

Once the data structure is recreated, then the recreated data structure may be accessed as in step 306. The data structures may be recreated for any additional accesses to the appropriate data structure as is required per step 309.

Those skilled in the art would recognize that other software layers and components within the kernel may be configured to manage and monitor the usage of pages and virtual memory storage units, and that the present invention may be applicable to other virtual memory settings beyond the use of operating systems. For example, in a further embodiment, the memory reduction operation may be performed by a hypervisor (a virtualization manager or platform that enables an operating system to run on another host computer) and other virtual execution environments which operate on top of an operating system. The disclosed memory management techniques are particularly applicable if the hypervisor is able to detect or receive a specification of which memory areas contain these kernel structures.

Therefore, a further advantage of the present invention is apparent in settings such as virtualization, where multiple instances may have copies of redundant memory structures. For example, within a KVM virtualization environment, both the host and guest have copies of the virtual memory table. Thus, without use of the presently disclosed optimization operations, this environment would result in double the amount of memory structures tied to the page frames stored within memory.

Additionally, those skilled in the art would recognize that the processes described within the scope of the present invention may be also be accomplished by numerous modifications to the algorithms and operations described above. Therefore, the operations described above may be optimized and applied according to the specific memory usage requirements of software applications, virtual machine environments, and operating systems, in addition to the additional features and limitations of memory management within disparate computer architectures.

As will also be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on processors or other suitable components within the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for reducing memory usage of kernel memory management structures, comprising:
   storing a plurality of virtual memory page frames within physical memory of a computer system;
   tracking the plurality of virtual memory page frames using a plurality of data structures stored within the physical memory, each data structure corresponding to one of the plurality of the virtual memory page frames, wherein the plurality of data structures are managed by a kernel of an operating system environment executing on the computer system;
   identifying, within the plurality of data structures, one or more selected series of data structures which track virtual memory page frames stored contiguously within the physical memory; and
   removing each redundant data structure from physical memory by freeing resources of the physical memory used by the redundant data structure, the redundant data structures comprising each data structure following a first data structure within the identified series of data structures.

2. The method of claim 1, further comprising recreating one or more removed redundant data structures previously existing within physical memory responsive to the one or more removed redundant data structures being referenced within the kernel.

3. The method of claim 1, wherein the redundant data structures are determined within the physical memory by performance of a detection operation within the kernel.

4. The method of claim 1, wherein the redundant data structures are determined within the physical memory by being explicitly specified.

5. The method of claim 1, wherein the redundant data structures are determined within the physical memory after performance of a partial memory hot-add operation by tracking which data structures are unused during the hot-add operation.

6. The method of claim 1, wherein the redundant data structures are determined within the physical memory by tracking through a hypervisor.

7. The method of claim 1, wherein freeing resources of the physical memory further comprises invaliding the hardware page table mappings to the redundant data structures and freeing the memory locations underlying the redundant data structures.

8. A computer system, comprising:
at least one processor; and
at least one memory storing instructions operable with the at least one processor for reducing memory usage of kernel memory management structures, the instructions being executed for:
storing a plurality of virtual memory page frames within physical memory of the computer system;
tracking the plurality of virtual memory page frames using a plurality of data structures stored within the physical memory, each data structure corresponding to one of the plurality of the virtual memory page frames, wherein the plurality of data structures are managed by a kernel of an operating system environment executing on the computer system;
identifying, within the plurality of data structures, one or more selected series of data structures which track virtual memory page frames stored contiguously within the physical memory; and
removing each redundant data structure from physical memory by freeing resources of the physical memory used by the redundant data structure, the redundant data structures comprising each data structure following a first data structure within the identified series of data structures.

9. The system of claim 8, further comprising instructions being executed for recreating one or more removed redundant data structures previously existing within physical memory responsive to the one or more removed redundant data structures being referenced within the kernel.

10. The system of claim 8, wherein the redundant data structures are determined within the physical memory by performance of a detection operation within the kernel.

11. The system of claim 8, wherein the redundant data structures are determined within the physical memory by being explicitly specified.

12. The system of claim 8, wherein the redundant data structures are determined within the physical memory after performance of a partial memory hot-add operation by tracking which data structures are unused during the hot-add operation.

13. The system of claim 8, wherein the redundant data structures are determined within the physical memory by tracking through a hypervisor.

14. The system of claim 8, wherein freeing resources of the physical memory further comprises invaliding the hardware page table mappings to the redundant data structures and freeing the memory locations underlying the redundant data structures.

15. A computer program product comprising a computer useable medium having a computer readable program for reducing memory usage of kernel memory management structures, wherein the computer readable program when executed on a computer system causes the computer system to:
store a plurality of virtual memory page frames within physical memory of the computer system;
track the plurality of virtual memory page frames using a plurality of data structures stored within the physical memory, each data structure corresponding to one of the plurality of the virtual memory page frames, wherein the plurality of data structures are managed by a kernel of an operating system environment executing on the computer system;
identify, within the plurality of data structures, one or more selected series of data structures which track virtual memory page frames stored contiguously within the physical memory; and
remove each redundant data structure from physical memory by freeing resources of the physical memory used by the redundant data structure, the redundant data structures comprising each data structure following a first data structure within the identified series of data structures.

16. The computer program product of claim 15, wherein the computer readable program further causes the computer system to recreate one or more removed redundant data structures previously existing within physical memory responsive to the one or more removed redundant data structures being referenced within the kernel.

17. The computer program product of claim 15, wherein the redundant data structures are determined within the physical memory by performance of a detection operation within the kernel.

18. The computer program product of claim 15, wherein the redundant data structures are determined within the physical memory by being explicitly specified.

19. The computer program product of claim 15, wherein the redundant data structures are determined within the physical memory after performance of a partial memory hot-add operation by tracking which data structures are unused during the hot-add operation.

20. The computer program product of claim 15, wherein the redundant data structures are determined within the physical memory by tracking through a hypervisor.

21. The computer program product of claim 15, wherein freeing resources of the physical memory further comprises invaliding the hardware page table mappings to the redundant data structures and freeing the memory locations underlying the redundant data structures.

* * * * *